United States Patent [19]

Haselden et al.

[11] 4,042,339
[45] Aug. 16, 1977

[54] PRODUCTION OF NITRIC ACID

[75] Inventors: Geoffrey Gordon Haselden; Douglas Handley, both of Leeds, England

[73] Assignee: University of Leeds Industrial Services Limited, England

[21] Appl. No.: 576,123

[22] Filed: May 9, 1975

[30] Foreign Application Priority Data

May 20, 1974 United Kingdom ............... 22448/74

[51] Int. Cl.² .................. B01J 7/00; C01B 21/40; F23L 15/02; F28D 17/02
[52] U.S. Cl. .................. 23/262; 23/277 R; 23/284; 165/4; 165/7; 423/390
[58] Field of Search ... 23/262, 277 R, 290 (U.S. only), 23/284, 281; 423/390, 393, 400, 402, 405; 165/4, 7, 9.1, 9.2, 9.4; 48/212 (U.S. only), 107 (U.S. only), 102 R (U.S. only), 196 R (U.S. only)

[56] References Cited

U.S. PATENT DOCUMENTS

| 2,422,081 | 6/1947 | Cottrell | 423/405 |
| 2,704,242 | 3/1955 | Strauss | 165/7 X |
| 2,955,917 | 10/1960 | Roberts et al. | 23/262 X |
| 2,956,864 | 10/1960 | Coberly | 23/277 R |
| 3,808,327 | 4/1974 | Roberts | 423/402 |

FOREIGN PATENT DOCUMENTS

| 481,629 | 3/1938 | United Kingdom | 423/393 |
| 758,417 | 10/1956 | United Kingdom | 423/393 |

Primary Examiner—Joseph Scovronek
Attorney, Agent, or Firm—Rose & Edell

[57] ABSTRACT

A process and plant is provided for the production of nitric acid from atmospheric air in which the feed air is passed in succession through a number of stages each comprising a high temperature regenerative nitrogen fixation reactor followed by a catalytic oxidation reactor and a nitric oxide absorber, all operating at superatmospheric pressure. Heat is exchanged between the inlet and outlet gas streams of each stage absorber. The compressors are driven by a turbo-expander powered by the exit gas stream in which fuel has been burned upstream of the turbo-expander. The nitrogen fixation reactors each consist of a pressure vessel enclosing a gas-permeable refractory wall surrounding a furnace chamber in which fuel is burned, the interior of the vessel being divided into two sections by an impermeable wall with a gap for flow through in the furnace zone.

9 Claims, 3 Drawing Figures

PRODUCTION OF NITRIC ACID

This invention relates to the production of nitric acid. More specifically, it concerns the formation of nitric oxide from air in a high temperature thermally regenerative nitrogen fixation reactor followed by its absorption to form nitric acid which may be of high concentration.

The basic chemical reactions underlying the process are well known and have given rise to several patents for different process systems to produce nitric acid some of which have progressed through research, development and production phases sufficiently to demonstrate the technical feasibility of such a process. However, the prior process systems have suffered from three main disadvantages, namely, high running costs of the high temperature reactor and both high capital costs and high running costs associated with achieving efficient recovery of the dilute nitric oxide produced and in producing a concentrated nitric acid (50% $HNO_3$ or greater) product.

It is an object of this invention to alleviate these problems. The maximum nitric oxide concentration which can be practicably obtained by heating and rapid cooling of air is about 2.0 mole % which necessitates that very large quantities of air have to be processed per unit production of nitric acid. The low nitric oxide concentration also makes desirable the compression of the nitrous gases at least to a pressure of several atmospheres absolute before they can be oxidised and absorbed in acceptably small vessels to produce, say, a 50% nitric acid product. All previous process systems have, due to the above factor, required large volume absorption systems and high gas compression costs thus making them commercially unattractive relatively to the conventional ammonia oxidation process for manufacturing nitric acid.

According to the present invention, the quantity of air requiring compression to a suitable absorption system pressure (in the range up to about ten atmospheres absolute) is reduced by operating a high temperature nitrogen fixation reactor at substantially the same superatomospheric pressure as a following absorber or adsorber and passing the process gases through a succession of such reaction and absorption or adsorption stages each extracting nitrogen oxides from the same gas stream. The feed air which must be compressed is thus reduced proportionally as the number of stages utilised in the process system is increased. The gas stream leaving each fixation reactor may be subjected to catalytic oxidation before entering the respective absorber or adsorber.

The invention provides not only this production method but also plant for carrying the method into practice. This plant includes special nitrogen fixation reactors each comprising a pressure vessel enclosing a refractory gas-permeable regenerator wall that in turn surrounds a furnace chamber in which fuel can be selectively burned, the interior of the pressure vessel being divided into at least two sections by a gas-impermeable wall that has a gap for intercommunication between the sections within the furnace chamber, each section communicating with a respective gas inlet/outlet in the pressure vessel wall through a respective portion of the gas-permeable refractory wall.

Arrangements in accordance with the invention will now be described by way of example with reference to the accompanying drawings, in which.

Figure 1:
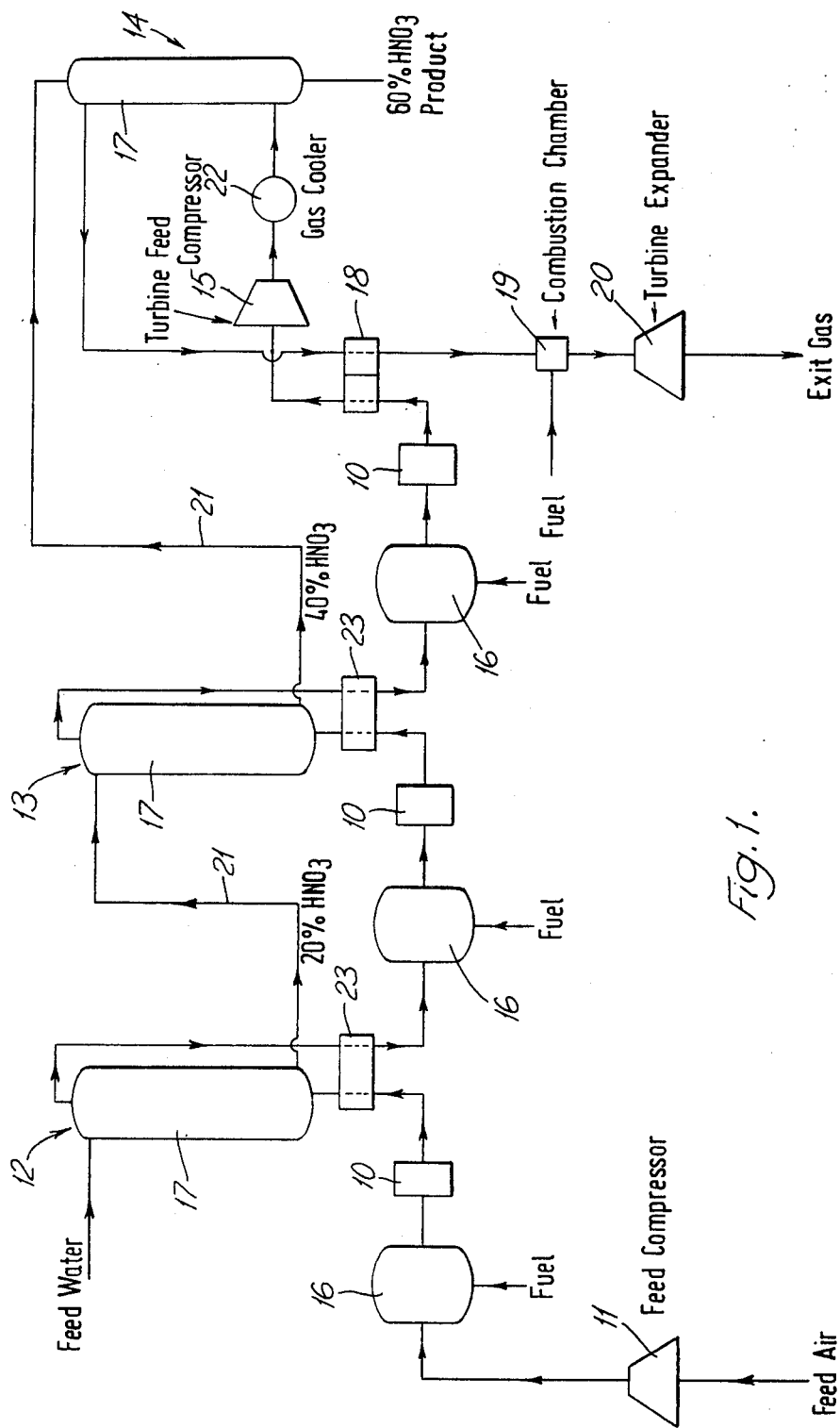
FIG. 1 is a flow diagram of the plant to be described.

In the plant of FIG.1, feed air is compressed to several atmospheres absolute in a main feed compressor 11 and is then passed through a series of three reaction absorption stages 12, 13, 14 each comprising a nitrogen fixation reactor 16 followed by a catalytic oxidation reactor 10 and then an absorber 17. On leaving the third oxidation reactor 10, the gas stream is compressed in a second compressor 15 to a higher absorption pressure (say 10 atmospheres) so that the efficiency of $NO_2$ removal in the third absorber 17 is increased sufficiently to reduce the concentration in the process exit gas to an acceptable level. The second compressor is followed by an aftercooler 22. The final exit gases from the third absorber 17 are reheated by heat exchange in a heat exchanger or thermal regenerator 18 with gases entering the second compressor 15 and the exit gas temperature is raised further by combustion of sufficient fuel in a combustion chamber 19 to generate enough power to drive the two compressors by expanding the exit gases to 1 atmosphere in a gas turbine 20.

Each catalytic oxidation reactor 10 converts most of the nitric oxide formed in the preceding nitrogen fixation reactor 16 into nitrogen dioxide.

The acid stream 21 absorbing the nitrogen dioxide in the absorbers 17 flows through the absorbers in series leaving the final absorber at about 60% $HNO_3$. Heat removal is effected from the absorbers by means of internal water-cooled surfaces.

A substantial decrease in fuel required by the gas turbine 20 can be achieved by providing, as well as the heat exchanger 18, a heat exchanger or thermal regenerator 23 to exchange heat between the gases entering and leaving each of the first and second absorbers 17. If regenerators are used for this duty they may be either rotary or switching. The arrangement ensures that a high proportion of the fixation reactor furnace waste heat is passed successively on through the stages to emerge finally in the gases being fed to the combustion chamber 19 before the exit gas turbine 20. In addition to reducing the fuel requirements this also reduces the cooling water requirements of the process.

The provision of the catalytic oxidation reactors 10 not only reduces the volume of the absorbers required, but also it enables the heat of oxidation to be recovered in the heat exchangers 23, 18, thus further improving the thermal efficiency of the plant and reducing the heat removal needed in the absorbers 17.

Figure 2:
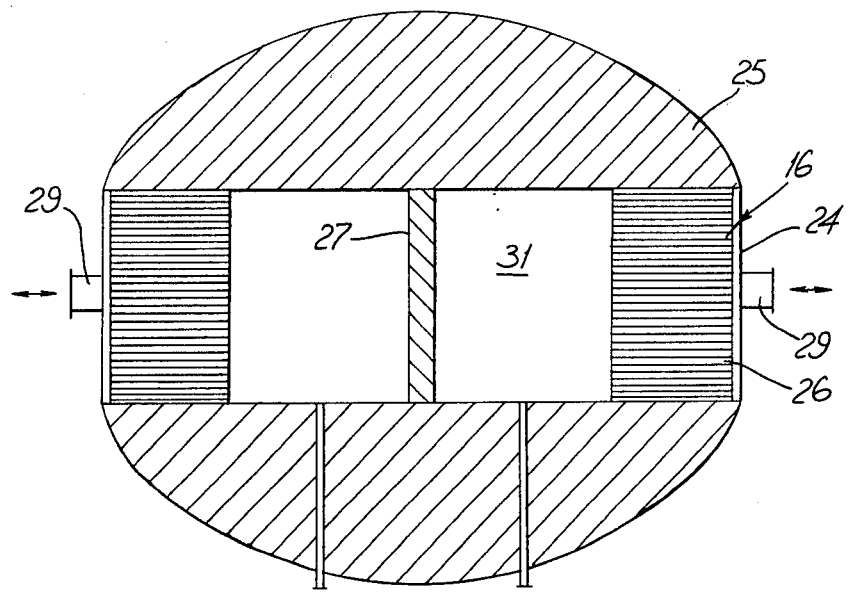
FIGS. 2 and 3 show in diagrammatic cross-sectional elevation and sectional plan, respectively, a reactor vessel for the plant of FIG. 1.
Figure 3:
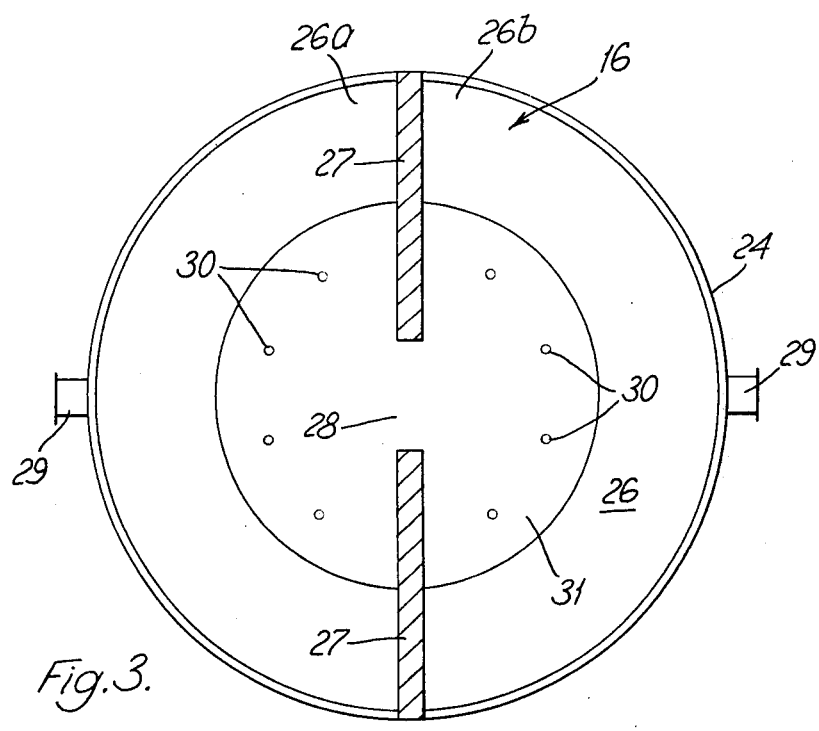

FIGS. 2 and 3 show a particularly advantageous construction of the nitrogen fixation reactors 16. Each reactor must offer a high thermal efficiency so that excessive amounts of fuel need not be burnt in the reactor leading to high fuel costs and to a serious progressive reduction of oxygen content and nitric oxide formation in the successive fixation reactors. The reactor pressure drop must be acceptably small so that the system pressure does not fall too rapidly resulting in increased turbine fuel requirements. The required reactor size must not be so large as to create difficulties in construction and very high capital cost. The amount of special refractory required in the highest temperature region of the reactor must be minimised.

Operation of the fixation reactor at several atmospheres pressure reduces the power cost for meeting the pressure losses through the system. It also allows the mass velocity of the gas through the reactor furnace walls to be increased thus reducing the reactor size and capital cost. Increasing the gas pressure in the reactor increases the nitric oxide reaction rates and fuel combustion rates so that establishing the equilibrium high temperature nitric oxide concentration is less difficult. However, it will increase the difficulty of recovering a maximum fraction of the equilibrium nitric oxide during the quenching of the reactor exit gases. This last problem can be largely overcome by correctly choosing the reactor dimensions, the geometry of the flow passages through the reactor walls and the superficial mass velocity of the gases.

In order to meet the above requirements, the reactor 16 is of vertical cylindrical shape suitable for construction and operation inside a cylindrical steel pressure vessel 24 having dished ends 25. The reactor walls 26 are permeable to gas flow and divided into two essentially semi-annular walls 26a, 26b by means of two diametrically-opposed impermeable refractory brick walls 27, between which there is a gap 28 for gas flow. The process gases enter and leave through diametrically-opposed inlets/outlets 29, the reactor operating on the regenerative principle with flow reversal. The thermal regenerator walls 26 can be constructed from stacked refractory plates or tiles, with gaps between, of carefully chosen shape and dimensions in order to satisfy the requirement for high thermal efficiency, low pressure drop and rapid quenching of the exit gases.

In one form, the refractory plates or tiles are of trapezoidal shape, such as to enable them to build up readily into an annulus, having cylindrical studs protruding from one side, and if desired, corresponding shallow recesses on the reverse side. This allows the plates to be stacked in an overlapping arrangement with interlocking of the studs of one plate into the recessed dimples, if provided, of plates below. A mechanically strong and rigid bed with narrow parallel flow passages of correctly accurate spacing can thus be obtained.

However, other arrangements are possible; each regenerator wall could be built up from loosely laid elements of other design or could be constructed as an all-ceramic integral wall.

The flow direction of the gases must be reversed at fairly short cycle times in order to maintain a thermal efficiency of about 95% which is necessary for an attractive fuel consumption without excessive depletion of oxygen content in the process gases. The annular geometry of the regenerator walls produces a faster quench rate in the high temperature regions whilst rapid flow reversal helps to maintain steady temperature profiles in the solid so that the refractories used for the plates can be graded, according to the temperature at which they are required to operate. An inner layer of zirconia tiles or bricks may be provided for the highest temperature regions with lower temperature zones of alumina and fireclay refractories. The impermeable dividing walls 27 are brought close together thus narrowing the gap 28 through which gases flow in the centre of the reactor which encourages better mixing of process air and combustion gases.

The relatively small flow of fuel gas, such as methane, required can be injected at high velocity through the reactor floor into the high temperature zone using a water-cooled probe. The high injection velocity encourages rapid gas mixing and combustion thus maintaining a uniform high temperature reaction zone. If desired, multiple smaller fuel injection probes 30 may be provided as shown in order to improve gas mixing to reduce flame sizes which might otherwise damage the refractory tiles if they were subjected to direct flame impingement. The burner probes in use will be switched from one side of the dividing walls 27 to the other simultaneously with each flow reversal. The furnace reaction zone 31 may be filled with an open-structured arrangement of zirconia bricks of large void space but with sufficient strength to support light-weight insulating bricks of the roof structure.

Purely by way of illustration, for a plant to produce 200 tons/day of 100% $HNO_3$ incorporating three reaction and absorption stages in series, the reactor design specification, with a gas pressure of, say, 4.0 ats absolute, may be as follows:

Gas throughput 6,100 lb moles/hr,
Annular regenerator wall of interlocking tiles 7.0 ft. high,
Inside diameter of annular wall 13.0 ft.,
Outside diameter of annular wall 21.0 ft.,
Superficial mass velocity of gas through inside face of regenerator wall 1230 lbs/hr-ft$^2$,
Inlet air temperature cold side = 25° C.
Inlet air temperature hot side = 2200° C,
Thermal efficiency of regenerators 95.5%,
Calculated pressure drop across two beds less than 0.1 atmos,
Approach to equilibrium nitric oxide concentration inside the reactor core = 100%,
Percentage of equilibrium nitric oxide recovered as the gas is rapidly cooled in the exit regenerator bed = 90.0%,
Refractory tiles are 6mm thick with 1.5 mm raised studs to give plate separation, there being 17 studs on 35 cm$^2$ of the surface, 34 tiles per foot height of regenerator wall,
Solid refractory tile temperature swing during one heating or cooling cycle = 66° C.

Although FIG. 1 shows the proposed layout of plant, considerable modifications are possible without departing from the scope of the invention.

Thus, further intermediate compressors or blowers can, if desired, be provided between successive reaction absorption stages to avoid an excessive reduction in system pressure due to accumulating pressure drops. Or to simplify the plant, with, however, some loss of nitrogen oxides recovery, only the main feed compressor 11 may be utilised, the second compressor 15 being omitted so that the final absorber operates near to the main system pressure. In this case, the final exit gas is expanded in the turbine 20 from the main system pressure down to 1 atmosphere. Another simplification is to replace each of the rotary or switching heat exchangers 23 by a simple cooler cooling the process gas stream before entry into the absorber, again with loss of efficiency.

Whereas the acid flow stream 21 is shown progressing from the first absorber to the last in the same sequence as the process gas stream it can, if desired, proceed in the reverse sequence from the last to the first, thereby achieving a countercurrent effect leading perhaps to increased $NO_2$ absorption rates and recovery efficiencies.

The process is clearly not restricted to three stages. Up to six stages of reaction and absorption can be provided without serious loss of nitrogen oxides and HNO$_3$ production efficiency and additional stages provide a ready means of increasing plant capacity and reducing the fuel cost per unit product.

The absorbers preceding the last can, if desired, be replaced by adsorbers containing a granular adsorbent solid such as silica gel. The use of the heat exchangers and catalytic oxidation units, coupled with operation under pressure, will make the use of solid adsorbents for the nitrogen dioxides more economic than the use of conventional liquid scrubbing absorber vessels in some situations. The adsorbent may be contained in a pair of switched beds, or it may be in the form of a moving bed. During regeneration the adsorbed nitrogen dioxide will be driven off in concentrated form and can be converted into nitric acid in the final absorption column.

The advantages of the process overall may be summarised as follows:

The provision of a multi-stage system, comprising alternating reactor and absorption stages, means that only the final stage of absorption has to be designed to meet stringent environmental pollution requirements, whilst intermediate stages can be designed on economic criteria alone. In prior proposals there has been the economic handicap of having to scrub vast quantities of exit gases down to very low levels of oxides of nitrogen concentration before venting to atmosphere.

The compression of the feed air reduces the size and consequently the capital cost of reactors, absorbers, pipelines, valves and heat exchange equipment. Such compression becomes economic in a multi-stage system because the volume of air to be compressed per ton of nitric acid produced decreases in substantial proportion to the number of stages.

The annular regenerative reactor proposed for the nitrogen fixation has a higher thermal efficiency than regenerative reactors previously used, together with lower heat losses. Depletion of the oxygen needed for the combustion of fuel is thus reduced, thereby increasing the number of stages which can be employed. This reactor design also has a low pressure drop, economises in the use of expensive high temperature refractory, and is suitable for operation under pressure. With this type of furnace, not only is it possible to vary the material of the packing so that the most expensive refractory is used only in the highest temperature zone, but also the geometry of the packing can be changed to incorporate, for instance, narrower passages in the highest temperature region giving a higher gas flowrate and heat transfer rate in this zone. Thus, a high quenching rate can be achieved without having an excessive pressure drop, as would occur if very fine flow passages were used throughout the packed bed. The length of the packing elements, measured in the direction of gas flow, can also be made shorter in the highest temperature region so that the heat conduction through the solid in the same direction is reduced.

Improved thermal economy is achieved by the use of heat exchangers or regenerators interchanging heat between the gas streams going to and from the absorbers. In this way, the residual thermal inefficiency of the nitrogen fixation is partially counteracted, and the resulting saving is manifested in the expansion turbine. The thermal economy in the system is further increased by employing catalytic oxidation of nitric oxide to nitrogen dioxide between the nitrogen fixation reactor outlet and the heat exchanger or regenerator. A temperature rise of the order of 40° C. can be expected from the oxidation process, and this can be made cumulative in that the exit gases entering the expansion turbine are eventually influenced by all such temperatures rises occurring at every stage.

What we claim is:

1. A reactor to be operated at superatmospheric pressure and on the regenerative principle with flow reversal comprising a stationary steel pressure vessel capable of withstanding an internal pressure of a plurality of atmospheres, a stationary refractory gas-permeable regenerator wall enclosed by said pressure vessel and in turn surrounding a cylindrical furnace chamber, burner means for introducing and burning fuel in said furnace chamber, a stationary gas-impermeable dividing wall dividing said cylindrical furnace chamber into sections, said dividing wall having a gap for intercommunication between the sections of said furnace chamber, and a respective gas inlet/outlet in the pressure vessel wall communicating with each furnace chamber section through a respective portion of the gas-permeable refractory wall.

2. A reactor according to claim 1, wherein means are provided for switching burning of fuel within the furnace chamber from one side of the dividing wall to the other coincidently with gas flow reversal.

3. A reactor according to claim 1, wherein the fuel is injected at high velocity by means of a probe or probes.

4. A reactor according to claim 1, wherein the refractory gas-permeable wall is constructed from stacked refractory plates or tiles with gaps between.

5. A reactor according to claim 1, wherein the highest temperature regions of the refractory wall are built from zirconia elements and the regions of lower temperature from alumina and/or fireclay elements.

6. A plant for the production of nitric acid, having a succession of plant stages through which the same gas stream passes under pressure, including a last stage from which the gas stream exits, each stage comprising a regenerative high temperature superatmospheric nitrogen fixation reactor according to claim 1, with each reactor before the reactor of said last stage being followed by a vessel containing sorption means for nitrogen oxides, and the reactor of said last stage being followed by a last stage absorber vessel, with liquid flow lines passing an acid stream through the vessels of all the stages to extract nitrogen oxides from the gas flow in each said vessel.

7. A plant according to claim 6 wherein each stage further comprises a catalytic oxidation reactor intermediate the nitrogen fixation reactor and the sorption means.

8. A plant according to claim 6, wherein each stage further comprises a regenerative heat-exchanger in which heat is exchanged between the gas streams entering and leaving the sorption means.

9. A plant according to claim 6, further comprising a first compressor compressing incoming feed air, a second compressor increasing the pressure of the feed gas stream before it enters the last stage absorber, a turboexpander powered by the exit gas stream and driving said compressors, and a combustion chamber in which fuel is burned in the exit gas stream upstream of the turboexpander.

* * * * *